United States Patent [19]
Henise

[11] Patent Number: 5,653,789
[45] Date of Patent: Aug. 5, 1997

[54] WATER BASE CONDITIONER FOR ACRYLIC WOOD FLOORING

[75] Inventor: Peter D. Henise, Phillipsburg, Pa.

[73] Assignee: Permagrain Products, Inc., Newtown Square, Pa.

[21] Appl. No.: 247,861

[22] Filed: May 23, 1994

[51] Int. Cl.$^6$ .................................. C09G 1/00; C14C 9/02
[52] U.S. Cl. .................... 106/9; 106/18; 106/243; 106/244; 252/857
[58] Field of Search .................. 252/8.57; 106/18, 106/243, 244, 9

[56] References Cited

U.S. PATENT DOCUMENTS

| | | | |
|---|---|---|---|
| 1,136,742 | 4/1915 | Waters | 106/9 |
| 2,043,541 | 6/1936 | Jamieson | 427/371 |
| 2,081,073 | 5/1937 | Shuger | 106/5 |
| 2,126,096 | 8/1938 | Deguide | 106/8 |
| 2,734,879 | 2/1956 | Lyons | 106/222 |
| 3,485,573 | 12/1969 | Heyden | 427/386 |
| 3,488,202 | 1/1970 | Princen | 106/18 |
| 3,955,999 | 5/1976 | Snellgrove | 106/9 |
| 4,732,611 | 3/1988 | Raney | 106/9 |

FOREIGN PATENT DOCUMENTS

| | | | |
|---|---|---|---|
| 2052399 | 3/1993 | Canada | 106/18 |
| 49-38939 | 4/1974 | Japan | 106/18 |
| 56-26964 | 3/1981 | Japan . | |
| 5-11181 | 1/1995 | Japan . | |

OTHER PUBLICATIONS

Chemical Abstract No. 72:45141, which is an abstract of Finland Patent Specification No. 37218 (Feb. 1969).
Chemical Abstract No. 87–278790, which is an abstract of German Patent Sepcification No. 3,610,374 (Oct. 1987).
Chemical Abstract No. 91:118691, which is an abstract of French Patent Specification No. 2,392,787 (Dec. 1978).
Chemical Abstract No. 95:171338, which is an abstract of German Patent Specification No. 3,004,248 (Aug. 1981).
WPIDS abstract No. 72–68779T, which is an abstract of Soviet Union Patent Specification No. 326204 (Jan. 1972).

*Primary Examiner*—Anthony Green
*Attorney, Agent, or Firm*—Eugene E. Renz, Jr., P.C.

[57] ABSTRACT

A stable condition for surfaces, comprising a stable emulsion containing at least about 25% linseed oil and no more than about 75% water, the percentages being based on the total weight of the conditioner. The conditioner includes a water soluble emulsifier in an amount sufficient to emulsify all of the linseed oil in the water.

5 Claims, No Drawings

WATER BASE CONDITIONER FOR ACRYLIC WOOD FLOORING

FIELD OF THE INVENTION

This invention relates to liquid floor conditioners, both in bulk and aerosol form, and more particularly to flooring conditioners having an effective amount of linseed oil as the primary floor conditioning agent.

BACKGROUND OF THE INVENTION

Linseed oil is a highly effective, traditional flooring conditioner which forms the active component in a number of floor conditioner formulations. These traditional flooring conditioners contain solvents for the linseed oil phase. These solvent carriers are environmentally harmful, flammable, toxic and often times contribute to a spontaneous reaction.

Linseed oil, which is a relatively heavy oil closely approaching the chemical structure of a wax, is capable of providing a very desirable finish on wood and wood related products. Walters, U.S. Pat. No. 1,136,742 discloses a mixture of linseed oil, coal oil, other oils and a quantity of water. This represents a very early effort for making furniture polish. Jamieson, U.S. Pat. No. 2,043,541 and Shuter, U.S. Pat. No. 2,081,073 both disclose a similar formulation in playing soluble solvents.

Deguide, U.S. Pat. No. 2,126,096 forms a barium soap from barium hydroxide, linseed oil and water, along with flammable solvents. In the same line, Lyons, U.S. Pat. No. 2,734,879 reacts with linseed oil to form a product that is added to a solvent, such as an aromatic petroleum solvent, to adjust viscosity. Snellgrove, U.S. Pat. No. 3,955,999 mixes linseed oil with turpentine, naphtha and water to form a wax. Finally, Raney, U.S. Pat. No. 4,732,611 calls for a combination of linseed oil, turpentine and vinegar. As noted, none of these patents disclose a combination of linseed oil and a carrier system that does not employ solvent carriers which are flammable, toxic or otherwise environmentally harmful.

Accordingly, it is an object of the present invention to provide a formulation using linseed oil as a flooring conditioner in a formulation which does not involve flammable solvents.

Another object of the present invention is to provide a linseed oil for conditioning formulations in which water functions as the solvent and, additionally, in which water is not present to sufficient a degree to cause damage to wood and other cellulosic materials being conditioned.

Other objects will appear hereinafter.

SUMMARY OF THE INVENTION

It has now been discovered that the above and other objects of the present invention may be accomplished in the following manner. Specifically, a stable conditioner has been discovered for use with wood, leather and other related surfaces, including impregnated wood and specifically acrylic impregnated wood. It has been found that the stable conditioner of the present invention is capable of providing a truly conditioned surface with deep penetration of the conditioner where the drying characteristics of the conditioner are such that the surface does not "film over" or have an unsatisfactory appearance. Thus, both appearance and protection are achieved using the formula of this invention.

DETAILED DESCRIPTION OF THE PREFERRED EMBODIMENT

The specific stable conditioner of the present invention comprises a stable emulsifier containing at least about 25% linseed oil and no more than about 75% water. The water includes a water soluble emulsifier in an amount sufficient to emulsify all of the linseed oil in the said conditioner to thereby form the stable conditioning agent. All of the percentages used herein are by weight, based upon the total weight of the composition.

As noted above, the amount of linseed oil comprises of at least 25% by weight of the total weight. Preferred is a range from about 25% to about 50%, as it has been found that surfaces such as acrylic wood surfaces and the like will not become conditioned when the amount of linseed oil drops below about 25%. Similarly, compositions such as straight linseed oil, without any carriers or other liquids, will not effectively condition the surface since no penetration is achieved. For that reason, 50% is about the upper limit of desirable amounts of linseed oil. A preferred range is from about 30% to about 40% by weight, based upon the total weight of the composition.

The amount of water soluble emulsifier should be sufficient to emulsify all of the linseed oil in the water. Thus, if more linseed oil is present, such as about 40% by weight, more emulsifier will be needed than if 25% or 30% by weight of linseed oil is present. Typically, the amount of water soluble emulsifier will range from about 6% to about 24% by weight, based on the total weight of the conditioner.

Any water soluble emulsifier is effective in the present invention. Preferred are those low cost emulsifiers such as conventional emulsion stabilizers, amino-alcohols, leveling resins and fatty acids such as straight chain fatty acids. The appropriate components are blended with the linseed oil and/or the water phase and are mixed using normal mixing equipment at a slow speed for sufficient time to form a stable emulsion. Ten minutes is normally more than adequate to form the desired emulsion.

In order to demonstrate the surprising and effective results achieved by the use of the conditioner of this invention, a number of experiments were performed. In these experiments, it was determined that linseed oil is an effective conditioner for a variety of surfaces, such as wood, leather and the like. Particularly important is the ability of linseed oil, in accordance with the present invention, to condition impregnated wood and, specifically, acrylic impregnated wood. It has been discovered that if a conditioner is capable of conditioning acrylic impregnated wood, it is certain to be effective with other surfaces that are more easily penetrated.

Tests have shown that acrylic impregnated wood is not penetrated adequately when the concentration of linseed oil is less than 25% by weight of the total conditioner. In addition, while it is possible that conditioners having less than 25% by weight of linseed oil in water might effectively condition less difficult surfaces, such as plain wood for example, an additional problem exist for those type conditioning concentrations. Specifically, it is an old saying that water damages wood. It is also true in this case that when the concentration of linseed oil drops below 25% by weight, and the balance or substantially all of the balance is water, the possibility of water damage to the cellulose portion of the substrate becomes real. Accordingly, this lower limit of 25% and preferably 30% by weight linseed oil provides superior conditioning, even of difficult substrates such as acrylic impregnated wood, and prevents damage by the water on the cellulose portion of the composite.

Other experiments have been performed using formulations with greater percentages by weight of the linseed oil. In one instance, raw linseed oil is rubbed on the substrate being conditioned. It is possible in using sufficient effort, to rub raw linseed oil into substrates to obtain a "satisfactory" conditioning of the substrate. However, the final result achieved and the effort involved to achieve that result is not sufficient to replace commercial products having organic or soluble solvents. Both the difficulty in applying raw linseed oil and the results thereby obtained are less effective than prior art methods. However, if the amount of water used in the conditioner ranges from about 50% to about 75% by weight and preferably about 50% to 60% by weight based on the total weight of the conditioner, the linseed oil achieves highly effectively penetration and the substrate becomes fully conditioned. The carrier, water, permits penetration of the linseed oil without appreciable damage to the cellulose portion of the substrate.

Moreover, it has been discovered that formulations which have the preferred range of linseed oil and water without flammable solvents do not "film over" during drying and provide a much more satisfactory finish. The present invention has been shown in tests to provide an excellent finish with deep penetration without any adverse effect on the cellulose portion of the surface being treated.

Various modifications and alternative embodiments of the invention will become apparent to a skilled worker upon reading the foregoing. The invention is only to be limited by the following claims.

What is claimed is:

1. A stable conditioner for surfaces, comprising in weight percentages based upon the total weight of the conditioner:

from 25% to about 50% linseed oil;

from 50% to about 75% water; and from 6% to about 24% of a water soluble emulsifier selected from the group consisting of amino-alcohols, leveling resins and fatty acids.

2. The conditioner of claim 1 wherein the amount of linseed oil ranges from about 30% to about 40% by weight, based upon the total weight of the conditioner.

3. The conditioner of claim 1 wherein said emulsifier is an amino-alcohol.

4. The conditioner of claim 1 wherein said emulsifier is a straight chain fatty acid.

5. The conditioner of claim 1 wherein said emulsifier is a leveling resin.

* * * * *